United States Patent [19]

Chu et al.

[11] Patent Number: 4,476,262
[45] Date of Patent: Oct. 9, 1984

[54] AQUEOUS COATINGS COMPRISING IONIC POLYMER ESTER AND DILUENT POLYMER WITH REDUCED MONOMER RESIDUE AND METHOD OF PREPARATION

[75] Inventors: Shaw C. Chu, Belle Mead; Arthur T. Spencer, New Providence, both of N.J.

[73] Assignee: Mobil Oil Corporation, New York, N.Y.

[21] Appl. No.: 454,771

[22] Filed: Dec. 30, 1982

[51] Int. Cl.$^3$ .......................... C08J 3/06; C08L 3/02; C08L 3/10

[52] U.S. Cl. .................................. 523/412; 523/406; 523/408; 523/409; 523/414; 523/416; 523/424; 525/108; 525/119

[58] Field of Search ............... 525/108, 119; 523/408, 523/412, 414, 416, 424, 406, 409

[56] References Cited

U.S. PATENT DOCUMENTS

| | | | |
|---|---|---|---|
| 3,905,931 | 9/1975 | Ziegert | 523/408 |
| 3,943,187 | 3/1976 | Wu | 525/109 |
| 3,945,963 | 3/1976 | Levine et al. | 523/412 |
| 4,029,620 | 6/1977 | Chen | 523/409 |
| 4,212,781 | 7/1980 | Evans et al. | 523/412 |
| 4,247,439 | 1/1981 | Matthews et al. | 523/412 |
| 4,285,847 | 8/1981 | Ting | 260/29.2 |
| 4,303,565 | 12/1981 | Tobias | 523/412 |
| 4,377,433 | 3/1983 | Merz et al. | 523/412 |

FOREIGN PATENT DOCUMENTS

| | | | |
|---|---|---|---|
| 6334 | 1/1980 | European Pat. Off. | 525/119 |
| 3006175 | 8/1981 | Fed. Rep. of Germany | 523/412 |
| 52-33990 | 3/1977 | Japan | 525/108 |
| 56-95915 | 8/1981 | Japan | 523/410 |

*Primary Examiner*—Allan M. Lieberman
*Attorney, Agent, or Firm*—Alexander J. McKillop; Michael G. Gilman; Edward J. Trojnar

[57] ABSTRACT

A method for reducing extractable constituents of an undesirable monomer in compositions which comprise an ionic polymer and an addition polymer of the undesired monomer which comprises conducting an addition polymerization in the presence of the undesired monomer with another monomer which is copolymerizable therewith and which results in a less undesirable residue or a residue which is more easily removable, is disclosed.

18 Claims, No Drawings

AQUEOUS COATINGS COMPRISING IONIC POLYMER ESTER AND DILUENT POLYMER WITH REDUCED MONOMER RESIDUE AND METHOD OF PREPARATION

CROSS REFERENCE TO RELATED APPLICATIONS

An essential component of the composition of this invention is an ionic polymer which is the reaction product of an epoxy resin containing 1,2-epoxy groups, and acid containing polymer. Suitable ionic polymers are disclosed in the following applications which are incorporated herein by reference in entirety: U.S. application Ser. No. 249,795, filed Apr. 1, 1981 and now U.S. Pat. No. 4,442,246; U.S. application Ser. No. 221,641, filed Dec. 31, 1980 and now abandoned; and U.S. application Ser. No. 378,314, filed May 14, 1982.

A concurrently filed application by the same inventors named herein, U.S. application Ser. No. 454,818, entitled "AQUEOUS COATINGS COMPRISING DISPERSIBLE EPOXY RESIN-ACID POLYMER ESTER AND DILUENT POLYMER, AND METHOD OF PREPARATION" is incorporated herein by reference. The application discloses the compositions comprising an ionic water-dispersible epoxy resin-acid polymer and a diluent polymer which may be improved in accordance with the present invention.

BACKGROUND OF THE INVENTION

A variety of aqueous coating compositions comprising epoxy resin and acrylic polymer are known in the art and several are commercially available. In order to obtain desirable characteristics for many critical end use applications, such as coatings for sanitary cans, it is considered necessary to include a high proportion of epoxy resin in the composition. Epoxy contents of 60 to 80 percent are commonly used. Typical epoxy acrylic compositions are disclosed in U.S. Pat. No. 4,247,439 to Matthews and Sommerfield; U.S. Pat. Nos. 4,212,781 and 4,308,185 to Evans and Ting; and U.S. Pat. No. 4,302,373 to Steinmetz; all of which are incorporated herein by reference.

U.S. Pat. No. 4,285,847 to Ting discloses epoxy acrylic compositions in which the epoxy acrylic is made by the free-radical grafting of ionizable side chains onto an epoxy backbone; dispersing this product in water and thereafter polymerizing, in situ, addition polymerizable monomers which may or may not also contain ionizable groups. By this means the solids content of the composition is increased and the proportion of total epoxy resin in the composition is reduced by replacement with the cheaper addition polymer which serves as a diluent, thereby reducing the cost of the composition. However, the use of certain monomers in such a method may give a product with an undesired monomer residue. For example, the use of styrene and butyl acrylate in the preparation of the diluent polymer results in a product having an objectionable odor which is attributed to residual butyl acrylate which polymerizes more slowly than styrene. The method of this invention can be used to solve the problem of objectionable odor caused by butyl acrylate but is by no means so limited. The method has broad applicability in cases where an objectionable monomer residue occurs, particularly in aqueous coatings intended for use as sanitary can coatings.

BRIEF DESCRIPTION OF THE INVENTION

This invention relates to a process for preparing an aqueous dispersion composition reduced extractable constituents. The compositions include an ionic polymer component which is self-dispersible in water, and an addition polymer. Prior to treatment in accordance with this invention the compositions contain undesirable residue of monomer used to prepare the addition polymer. The undesired monomer residue is reduced by conducting an additional polymerization step in the presence of addition polymer containing residual monomer, with another monomer which is capable of copolymerizing with the undesired monomer and which results in a less undesirable monomer residue or a residue which is more easily removable.

DETAILED DESCRIPTION OF THE INVENTION

The process of this invention is broadly applicable to reduce undesired monomer residue from aqueous compositions which contain an ionic polymer and an addition polymer of the undesired monomer. Although the preferred compositions which are described in detail below contain an ionic polymer which is based on epoxy resin the ionic polymer is not so limited. For example, the ionic polymer can be the product of grafting ionic groups such as carboxyl groups onto a substrate such as homopolymers and copolymers of vinyl chloride; homopolymers and copolymers of acrylic monomers; hydrocarbon resins from butadiene, styrenes, and coumarone indenes; polyurethanes and polyesters, in accordance with the disclosure in U.S. Pat. No. 4,285,847 which is incorporated herein by reference.

Similarly, the undesired residual monomer can be any of a wide variety of monomers whose presence in the composition may be desirable for coating performance, for example, but the residue of which is objectionable for any reason. Thus, while the invention is illustrated with respect to residual butyl acrylate which gives an objectionable odor, the invention is equally applicable to the reduction of other monomer residues because of their toxicity, to meet governmental or customer requirements or for any other reason.

As indicated undesired monomer residue is reduced by polymerizing the undesired monomer with another monomer which is either less undesirable or which is more easily removed by conventional means such as stripping, and which readily copolymerizes with the undesired monomer. Of course, the copolymerizable monomer must be selected so that the resulting copolymer does not adversely affect the performance of the final coating composition.

The polymerization step in the presence of the undesired monomer is conducted at any convenient stage of the preparation of the compositions. Polymerization conditions and catalysts are conventional.

The preferred compositions of this invention comprise components, an ionic polymer component which contains sufficient carboxyl groups to render it self-dispersible in water in neutralized form which is the reaction product of an epoxy resin containing 1,2-epoxy groups with a preformed addition polymer containing carboxyl groups; and an addition polymer which is different from the addition polymer reacted with the epoxy resin to form the ionic polymer component. The entire composition is neutralized with ammonia or an organic amine in an amount sufficient to render the composition stably dispersible in water.

The ionic polymer component can be prepared by the methods disclosed in the copending applications cross referenced and incorporated by reference above or they can be prepared in accordance with the procedures described in U.S. Pat. No. 4,247,439 to Matthews and Sommerfield or U.S. Pat. No. 4,302,373 to Steinmetz both of which are also incorporated by reference. Briefly, the methods disclosed in the copending applications and the issued patents involve the reaction of an epoxy resin containing 1,2-epoxy groups with a preformed addition polymer containing carboxyl groups in the presence of a tertiary amine. In the copending applications the conditions are chosen so that an esterification reaction occurs between the epoxy groups of the epoxy resin and the carboxyl groups of the addition polymer. Reaction conditions in the aforementioned patents are selected in order to promote a reaction between the tertiary amine and epoxy groups giving quaternary ammonium groups in accordance with a well known reaction. It is believed that the reaction which is intended to promote esterification also results in the formation of quaternary ammonium groups by reaction between the epoxy groups and the tertiary amine. Also, the reaction described in the issued patents intended to produce quaternary ammonium groups can, under appropriate conditions, result in ester formation. The ionic polymers suitable for practicing the present invention therefore can contain quaternary groups, providing that hydroxy ester groups obtained by the reaction of epoxy groups with carboxyl groups are also present. At a minimum at least about 5 percent of the epoxy groups on the epoxy resin should be converted to hydroxy ester groups. Whatever the relative proportions of quaternary and hydroxy ester groups are the ionic polymer is reacted so that the ionic polymer is substantially free of unreacted 1.2-epoxy groups.

The ionic polymer may contain carboxyl polymer grafted to carbon atoms on the epoxy resin backbone but it is preferred that the ionic polymer is prepared under conditions in which grafting is avoided. The preparation of ionic polymers of epoxy resins which contain grafted carboxyl polymer is disclosed in U.S. Pat. Nos. 4,212,781 and 4,308,185, which are incorporated herein by reference.

In general, the epoxy resin constitutes at least about 40 percent of the ionic polymer and the carboxyl containing polymer comprises the balance. Preferably the epoxy content is at least 60 percent and most preferably about 75 percent.

The present invention is operable with a variety of epoxy resins. However, the epoxy resins which are preferred are aromatic polyethers, particularly those derived from the condensation of a bisphenol such as Bisphenol A, and epichlorohydrin. These epoxy resins possess hydroxy groups in addition to epoxy groups. The higher the molecular weight of the epoxy resin the more hydroxy groups are present. These hydroxy groups can participate in the final curing reaction. The preferred epoxy resins are aromatic polyethers having a number average molecular weight ($M_n$) of at least 1,500. However, the number average molecular weight of these resins can vary from about 350 to 6000.

As recognized in the art, epoxy resins prepared by the condensation of bisphenols and epichlorohydrin contain a mixture of diepoxides, monoepoxides and aromatic polyethers which are free of epoxy groups. The average functionality of such mixtures may range widely from about 0.2 epoxy groups per molecule to nearly 2 epoxy groups per molecule. Suitable mixtures of epoxy resins can be obtained by reacting a lower molecular weight epoxy resin having a functionality of between 1 and 2, for example, with a defunctionalizing agent which is capable of reacting with the epoxy groups. The defunctionalizing agent can contain carboxyl groups, hydroxy groups or amide groups, for example. Specific suitable materials include acids such as benzoic acid and fatty acids such as octanoic acid; hydroxy compounds such as phenols, in particular bisphenols and lower alkanols; and amides such as acrylamide. Defunctionalization with bisphenols is of particular interest since the epoxy resin is thereby upgraded to higher molecular weight at the same time as some of the epoxy groups are defunctionalized.

The carboxyl polymer is prepared by the addition polymerization of ethylenically unsaturated monomers comprising at least about 20 percent of an ethylenically unsaturated carboxylic acid based on the total weight of the monomers. Polymers and copolymers of this type are well known although the copolymers with particularly high proportions of carboxylic acid is preferred herein are somewhat unusual. Preferably the carboxyl containing polymer is a copolymer with ethylenically unsaturated monomers which are non-reactive under the contemplated conditions of polymerization and reaction with epoxy resin. However, small amounts of reactive monomers, e.g., hydroxy monomers such as 2-hydroxy ethylmethacrylate, amide monomers such as acrylamide, and N-methylol monomers such as N-methylol acrylamide, can be used. Suitable non-reactive monomers are, for example, acrylate and methacrylate esters such as ethyl acrylate, methyl acrylate, buty acrylate, styrene or vinyl toluene, vinyl acetate, vinyl chloride, vinylidene chloride, acrylonitrile, and the like. The function of these monomers is to enhance solvent solubility and to provide good film formation. Otherwise the nature and proportions are not critical to this invention.

The presence of a large proportion of carboxyl functional monomer is essential. The preferred minimum proportion of carboxyl monomer is 30 percent of the weight of the monomers used to prepare the carboxyl containing polymer. Methacrylic acid provides the best hydrolytic stability and is very much preferred, but other acids such as fumaric acid, acrylic acid, crotonic acid and itaconic acid and the like are useful. Up to about 80 percent of the monomers can be carboxyl functional, the maximum being determined by retention of solvent solubility of the copolymer.

The preferred polymers containing carboxyl groups generally having number average molecular weight ($M_n$) in the range of 3000 to 20,000, preferably 3,000 to 6,000. Molecular weight can be controlled by monomer content during polymerization, catalyst concentration and polymerization temperature in the known manner. Mercaptan chain termination is preferably avoided especially where the product is intended for use in coating of sanitary cans because of the offensive odor of mercaptans.

Generally, the addition polymer containing carboxyl groups is preformed and is reacted with the epoxy resin as a solvent solution in the presence of sufficient amine, preferably tertiary amine to promote the reaction. However, the addition copolymer can also be prepared by reacting a carboxyl containing monomer such as methacrylic acid with the epoxy group in the presence of tertiary amine and subsequently polymerizing additional monomers, in situ. The reaction between the oxirane groups of the epoxy resin and the carboxyl groups of the addition polymer is carried out in the presence of an esterification catalyst.

The preferred esterification catalysts are tertiary amines particularly, dimethylaminoethanol but other esterification catalysts particularly tertiary amines such as dimethylbenzylamine, trimethylamine, and tributylamine can be used. The amount of catalyst used can vary widely. For example, where a tertiary amine is used as little as 0.1–0.3 percent by weight of the catalyst based on the total amount of epoxy resin and carboxyl containing polymer can be used or the amount can be much larger up to about 10 percent and more of the reactants.

Another way of defining the amount of amine used is the relation to the total carboxyl content of the acid polymer. The amount of amine present during the reaction of the epoxy resin and carboxyl polymer will be sufficient to neutralize from about 5 to about 50 percent of the carboxyl groups in the acid polymer. Preferably, the amine is sufficient to neutralize between about 10 and about 35 percent of the carboxyl groups. Still another way of defining the amount of tertiary amine present during reaction of the epoxy resin and carboxyl polymer is by the equivalent ratio of amine to 1,2-epoxy groups. Preferably, this ratio is less than one thereby ensuring that some of the epoxy groups will be consumed in hydroxy ester formation by reaction with carboxyl group.

The amount of amine has a significant effect on the nature of the product of the reaction. In general, the smaller the amount of amine present during reaction the higher the viscosity of the product. This difference in viscosity is apparent in both the solvent solution and when the product is emulsified in water. The effect of the amount of amine used is observed even where the total amount of amine present in the dispersed product is identical. Thus, for example, the same product is not obtained when amine is present at the 40 percent neutralization level during reaction as when amine sufficient to neutralize 5 percent of the carboxyl groups is present during reaction and supplemented with 35 percent of the neutralization amount prior to dispersion in water.

The amount of amine present during reaction also has a pronounced effect on the particle size of the final dispersion. The relationship of amine content to particle size is illustrated in the following examples.

The second polymer different from the addition polymer used to prepare the ionic epoxy resin-acid polymer product can be prepared from a wide variety of unsaturated monomers. Particularly preferred are monomers which are free of functional groups reactive with epoxy resin or which would render the polymer self-dispersible in water. For example, there may be mentioned the esters of acrylic and methacrylic acid such as methyl acrylate, butyl acrylate, methyl methacrylate and butyl methacrylate; aromatic monomers such as styrene and methylstyrene; vinyl and vinylidene halides such as vinyl chloride and vinylidene chloride; isoprene; butadiene; acrylonitrile and the like. In certain applications it may be advantageous to include in the copolymer self-crosslinking monomers such as N-methyl acrylamide or N-isobutoxy acrylamide. Presently preferred monomers include styrene, methylstyrene and butyl acrylate and acrylonitrile.

The second polymer can be introduced at any convenient stage of the reaction. Preferably, the second polymer is prepared, in situ, in the presence of an aqueous dispersion of the ionic epoxy-acidic polymer reaction product. The reaction is conducted in the known manner. Advantageously, the reaction is initiated by a redox system. Inorganic or organic peroxide such as hydrogen peroxide or t-butyl hydroperoxide; or persulfates such as ammonium persulfate and alkali metal persulfates can be coupled with a suitable reducing agent such as hydrazine, ammonium or alkali metal sulfites, bisulfites, metabisulfites or hydrosulfites. The procedures disclosed in U.S. Pat. No. 4,285,847 which is incorporated by reference herein are suitable for conducting the polymerization.

The second polymer can also be introduced as a preformed polymer into either the aqueous dispersion of the ionic epoxy-acid polymer product or can be mixed with the ionic epoxy resin-acid polymer product before it is dispersed in water. Similarly, the second polymer can be mixed with a solvent solution of the acidic polymer prior to its reaction with the epoxy resin either by making the addition polymers separately or by preparing one in the presence of the other. The proportion of the second polymer in the composition can vary widely. The maximum is limited by the amount which can be stably dispersed in water by the ionic polymer component and the retention of desired film properties. Usually the weight ratio of the second addition polymer (B) to the ionic polymer (A) is from 0.05:1 to 10:1 but more preferably is 0.2:1 to 5:1.

The resins used in preparing the compositions of this invention are used by dissolution in a volatile organic solvent. A wide variety of solvents are suitable. Organic solvents of limited water miscibility, such as xylene, toluene, butanol and 2-butoxyethanol are useful, and they may be used alone or together with water miscible solvents, such as 2-ethoxyethanol or methyl ethyl ketone.

The final composition includes sufficient ammonia or amine to render the mixture self-dispersible in water. Preferably, a tertiary amine such as dimethylethanolamine is used. In general, the total amount of an amine or an ammonia present in the final product will be sufficient to neutralize at least about 25 to about 90 percent of the carboxyl groups present in the polymers used to prepare their composition. Finally, compositions, as used, preferably include a curing agent such as an aminoplast or a phenoplast resin in an amount of 1 to 25 percent, preferably from 3 to 10 percent, based on the solids of the composition.

This invention is illustrated by the following non-limiting example.

EXAMPLE

A. Preparation of Epoxy-Acrylate Dispersant

A 12 l reactor equipped with stirrer, reflux condenser, thermometer, heating mantle and nitrogen blanket was charged with 3800.7 parts butanol. A premix of 1652.4 parts glacial methacrylic acid, 824.4 parts styrene, 275.4 parts ethyl acrylate and 197.1 parts benzoyl peroxide (70% water wet) was also prepared. Twenty percent of the premix was added to the reactor which was heated to 93° C. under nitrogen and held at temperature for 15 minutes. The remaining premix was added over 5 hours at 93° C. after which this temperature was held for 2 hours. Butanol (2250.0 parts) was added to give an acrylic prepolymer solution at 33.5% NV, acid number of 392 and viscosity of 9660 centipoise.

In a five liter reactor equipped as above were charged 65.5 parts of 2-butoxyethanol, 655.9 parts Epon 828, 364.5 parts bisphenol A and 2.1 parts tri-n-butylamine. The charge was heated to 136° C. and allowed to exotherm to 175° C., then held at 150° C. for 1.5 hours. The upgraded epoxy was defunctionalized 33% by addition of 27.0 parts stearic acid to an epoxy value of 0.21 meq/g oxirane. 2-Butoxyethanol 164.0 parts, 100 parts butanol and 551.2 parts of the above acrylic containing 29.6 parts of a 25% aqueous solution of trimethylamine esterification catalyst were added. A cloudy, opaque mixture was formed which was held at reflux (109° C.) for constant acid number. At the end of 2.5 hours, the mixture had cleared completely and reached the acid number, 46.7, calculated for complete oxirane esterification. 2-Hexoxyethanol 18.0 parts, dimethylaminoethanol, 54.4 parts and Cymel 1156, 61.5 parts were added and stirred until uniform. Deionized water (2242 parts) was added to form a dispersion. After transfer to a 6 l container, 33 parts butanol and 17 parts 2-butoxyethanol were added and a finish was prepared at 19.5% NV by addition of deionized water.

B. Preparation of Styrene/Butyl Acrylate Modified Epoxy-Acrylate

Twenty three hundred parts of the above dispersion was transferred to a 5 l reactor equipped as before. A premix of 76.9 parts styrene, 76.9 parts butyl acrylate and 0.02 parts t-butyl hydroperoxide (90%) was prepared and emulsified in the reactor under a nitrogen blanket where it was heated to 65° C. A premix of 1.5 parts of ammonium bisulfite in 15 parts water was added and 70° C. was held for 3.0 hours. A premix of 38.4 parts styrene and 0.13 parts of t-butylhydroperoxide (90%) was then added followed in five minutes by a premix of 0.5 parts ammonium bisulfite in 5 parts water. The styrene overpolymerization was complete after holding at 70° C. for 2 hours. A spray finish at 20% NV was prepared by the addition of deionized water. The finish gave excellent properties for the coating of can interiors including resistance to fracturing on a 40° F. can drop test which is not passed by epoxy acrylates modified with 30% styrene add-on. The dispersion had a pleasant odor not objectionable for use as a commercial can coating.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A process for preparing an aqueous dispersion composition containing reduced extractable constituents which composition includes
   A. an ionic polymer component derived from an aromatic epoxy resin containing 1,2-epoxy groups which has been reacted to render it self-dispersible in water;
   B. a first addition polymer of a first monomer; in which the addition polymerization of said first polymer results in an undesirable residue of first monomer;
   the improvement comprising reducing the residue of said first monomer by conducting an additional in situ polymerization step, in the presence of an aqueous dispersion of said first addition polymer containing residual first monomer, with a second monomer which is capable of copolymerizing with said first monomer and which results in a less undesirable monomer residue or a residue which is more easily removable than said first monomer.

2. The process of claim 1 in which
   A. comprises an ionic polymer component containing sufficient carboxyl groups to render it self-dispersible in water in neutralized form which is the reaction product of an epoxy resin containing 1,2-epoxy groups, and a preformed addition polymer containing carboxyl groups, said ionic polymer containing hydroxy ester groups from the reaction of a majority of the 1,2-epoxy groups on said epoxy resin with carboxyl groups on said preformed addition polymer, and being substantially free of unreacted 1,2-epoxy groups; and
   B. comprises an addition polymer different from said preformed addition polymer defined in (A).

3. The process of claim 1 in which said addition polymer (B) is a copolymer of styrene and butyl acrylate and in which additional styrene is used as the monomer with a relatively faster rate of polymerization in the additional polymerization step to reduce the residual butyl acrylate.

4. The process of claim 2 in which said preformed addition polymer containing carboxyl groups is a copolymer of methacrylic acid.

5. The process of claim 2 in which said preformed addition polymer containing carboxyl groups is a copolymer of methacrylic acid, ethyl acrylate and styrene.

6. The process of claim 3 in which said 1,2-epoxy resin is an epichlorohydrin-bisphenol A epoxy resin.

7. The process of claim 4 in which said 1,2-epoxy resin is an epichlorohydrin-bisphenol A epoxy resin; said preformed addition polymer containing carboxyl groups is a copolymer methacrylic acid, ethyl acrylate and styrene; said addition polymer (B) is a copolymer of styrene and butyl acrylate; and styrene is used as the monomer with the relatively faaster polymerization rate to reduce the residual butyl acrylate.

8. The process of claim 1 in which the addition polymer B is prepared, in situ, in the presence of a water-dispersion of ionic polymer component A and in which said additional polymerization step is conducted thereafter.

9. The composition prepared by the process of claim 1.

10. The composition prepared by the process of claim 2.

11. The composition prepared by the process of claim 3.

12. The composition prepared by the process of claim 4.

13. The composition prepared by the process of claim 5.

14. The composition prepared by the process of claim 6.

15. The composition prepared by the process of claim 7.

16. The composition of claim 10 containing, in addition, a phenoplast or aminoplast cross-linking agent.

17. The composition of claim 14 containing, in addition, a phenoplast or aminoplast cross-linking agent.

18. The composition of claim 15 containing, in addition, a phenoplast or aminoplast cross-linking agent.

* * * * *